United States Patent
Buck

(10) Patent No.: US 12,020,274 B2
(45) Date of Patent: Jun. 25, 2024

(54) CRYPTOCURRENCY GAME REWARDS

(71) Applicant: John Buck, Palm Beach, FL (US)

(72) Inventor: John Buck, Palm Beach, FL (US)

( * ) Notice: Subject to any disclaimer, the term of this patent is extended or adjusted under 35 U.S.C. 154(b) by 0 days.

(21) Appl. No.: 16/397,959

(22) Filed: Apr. 29, 2019

(65) Prior Publication Data

US 2020/0342479 A1 Oct. 29, 2020

(51) Int. Cl.
*G06Q 30/0207* (2023.01)
*G06Q 20/06* (2012.01)
*G07F 17/32* (2006.01)
*H04L 9/06* (2006.01)
*H04L 9/00* (2022.01)

(52) U.S. Cl.
CPC ....... *G06Q 30/0209* (2013.01); *G06Q 20/065* (2013.01); *G06Q 30/0212* (2013.01); *G07F 17/3255* (2013.01); *G07F 17/3258* (2013.01); *H04L 9/0637* (2013.01); *H04L 9/0643* (2013.01); *G06Q 2220/00* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | |
|---|---|---|---|
| 2005/0149940 A1* | 7/2005 | Calinescu | G06F 9/5061 718/104 |
| 2008/0009344 A1* | 1/2008 | Graham | G07F 17/32 463/25 |
| 2013/0065669 A1* | 3/2013 | Michaelson | G07F 17/3225 463/25 |
| 2014/0280668 A1* | 9/2014 | Brown | G06F 3/0605 709/213 |
| 2017/0124267 A1* | 5/2017 | Ting | G16H 40/20 |
| 2017/0249606 A1* | 8/2017 | Pirooz | G06Q 40/02 |
| 2019/0213048 A1* | 7/2019 | Mason | H04L 67/32 |
| 2019/0303960 A1* | 10/2019 | Walsh | G07F 17/32 |
| 2019/0318424 A1* | 10/2019 | McWilliams | G06Q 20/02 |

* cited by examiner

*Primary Examiner* — Steven S Kim
*Assistant Examiner* — Jason B Fenstermacher
(74) *Attorney, Agent, or Firm* — Boswell IP Law; J. Mason Boswell

(57) ABSTRACT

A game reward system is described herein that pays players to play a video game. The system does this by utilizing the unused resources of the player's computing device to perform cryptographic hashes and mine one or more cryptocurrencies. The game reward system generates a jackpot based on the cryptocurrency that has been mined, allocates some amount to the system operator for profit of running the system (e.g., 10%), and divides the remaining amount among the players of enough rank as a reward. Instead of charging people to buy a game, the game maker using the game reward system can make the game free for players to play. Thus, the game reward system completely changes the business model of games, makes games more fun, and rewards players in a new way for playing games.

12 Claims, 3 Drawing Sheets

CRYPTOCURRENCY GAME REWARDS

BACKGROUND

Video games today often include intensive graphics, artificial intelligence (AI), and other features that utilize the significant resources available in modern computers. For example, a game may utilize a dedicated graphics processing unit (GPU) for rendering textures and other graphics, a powerful central processing unit (CPU) for calculating physics interactions and performing AI calculations to animate enemies or other non-player characters (NPC), and networking and other resources that allow the player to play with other players that may be located all over the world, connected via the Internet. Even with all the high requirements of a modern game, resources of the computing device on which the game operates are sometimes idle or not fully utilized.

Far from the bulky desktop computers of many years ago, the computing devices of today can be quite small and portable. A modern smartphone has many times the processing and graphical power of a desktop computer of several years ago. For example, the Apple iPhone X released in 2017 includes a 64-bit CPU with six cores and a GPU with three cores both paired with 3 GB of RAM and as much as 256 GB of flash-based storage. These are very powerful specifications and allow today's mobile devices to run very sophisticated games, many of which have yet to be written for these types of devices. These numbers will only increase over time, providing ever greater performance. Desktop computers have become even more powerful, with some companies introducing motherboards that allow for 32, 64, or even more GPUs that can be applied to processing problems. These are often used for gaming and other computing tasks that rely on the very latest hardware.

Cryptocurrencies are a new type of currency to be used as money to pay for goods and services just like all other types of currency (e.g., gold, U.S. dollars, and so forth). Currencies typically are considered to have five key characteristics: 1) scarcity, fungibility, divisibility, durability, and transferability. Cryptocurrencies originate in the digital rather than the physical world and excel at all these capabilities. Unlike gold, which is made scarce by the need to mine it from the ground, or U.S. dollars, which are made scarce by the government carefully controlling the issuance of notes, cryptocurrencies are made scarce by the difficulty of performing hard cryptographic calculations. Computing devices are enlisted to "mine" cryptocurrencies by performing these calculations for a designated central provider that receives the results and issues new currency based on the work done to mine the currency. The keeping of the list of records of all the cryptocurrency issued is often called a blockchain, after the technique used to bundle the records and convey them to everyone involved with the currency. The blockchain provides a public ledger of all transactions and does not require a trusted authority or central server to manage the currency.

Video games often cost money to play and players are disincentivized to play them by the time and money involved in doing so. Of course, because video games are fun, people often overcome this disincentive, but there are many more people that would play a game that do not, because they simply lack the time or the money to do so. Many games benefit from a very high player count. For example, massively multiplayer online role-playing games (MMORPGs) get better as more players involve themselves in the virtual worlds of these games. It is thus a goal of many video game makers to figure out how to get as many people to play the game as possible, while also making a nice profit to support the further development of the game.

DETAILED DESCRIPTION

Figure 1:
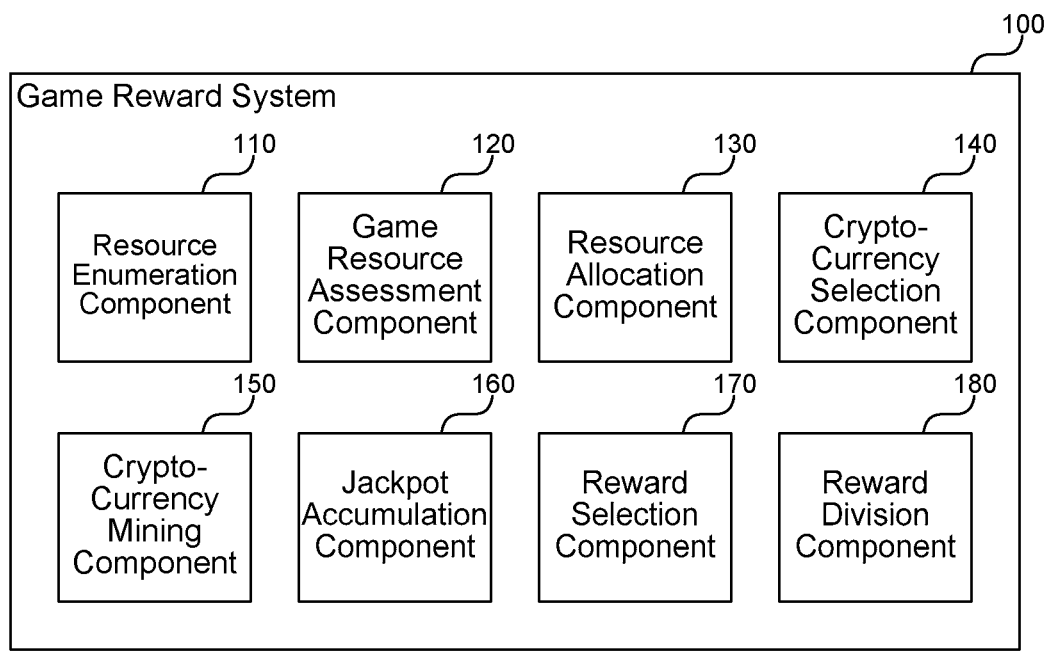
FIG. 1 is a block diagram that illustrates components of the game reward system, in one embodiment.

A game reward system is described herein that pays players to play a video game or at least pays the game operator for the player to play the game so the player can play without spending the player's own money. The system does this by utilizing the unused resources of the player's computing device to perform cryptographic hashes and mine one or more cryptocurrencies. Because computing devices used to play video games are very powerful and are often not fully utilized, there is available a set of resources that can be used to mine cryptocurrency without impacting the game play experience of the player. For example, if the CPU is only 50% utilized performing the calculations needed to play the game, then another 50% is potentially available for mining cryptocurrency. Likewise, other resources such as the GPU may not be fully utilized and may be able to be used for cryptocurrency mining.

Imagine, for example, one-thousand players playing an online videogame on smartphones. Each hour, these phones can perform roughly 10 hashes each at current hardware levels, and thus in the aggregate can generate $40/hour using current values. Many games have some type of ending in which a winner is declared and other players can be ranked second, third, fourth, and so on. The game reward system generates a jackpot based on the cryptocurrency that has been mined, allocates some amount to the system operator for profit of running the system (e.g., 10%), and divides the remaining amount among the players of enough rank as a reward. For example, in a game that lasts an hour in which $40 of cryptocurrency has been mined, $4 may be allocated to the system operator, $20 may go to first place, $10 may go to second place, and $6 may go to third place. Other places, even though they do not win a prize are able to play for free as the game operator has been compensated by use of their reserve computer resources. These numbers and game modes are just for examples, a particular system implementor can tune the system and rewards to his or her own specification.

The system behavior has several important implications. First, instead of charging people to buy a game, the game maker using the game reward system can make the game free for players to play. This allows a whole new set of players that may previously have lacked the funds to buy the game to become involved in the game play. Second, players that dedicate the time to become very good at the game can receive a monetary reward for playing that compensates them for their time invested in the game. It is even possible for those very good at the game to make a reasonable living just playing their favorite game. Third, because of the influx of players to the game due to reducing the money and uncompensated time required to play, the game can have many more players which serves to drive the fun of the game much higher. Thus, the game reward system completely changes the business model of games, makes games more fun, and rewards players in a new way for playing games.

The game reward system starts by determining the available resources of a computing device on which the system is running. Each player has an associated computing device, and each of these devices has some number of resources, each with a level of utilization over time. Utilization may go up and down during peak and non-peak aspects of game play so that the system may determine periodically that more or fewer resources are unused and could be used for mining cryptocurrencies. Next, the system dynamically determines the game requirements. Game requirements can change based on the number of enemies or other players on the screen (which may involve more CPU usage for their game play mechanics) or for many other reasons. Next, the system determines a resource load to use. In some embodiments, the system leaves a margin of safety (e.g., 10%), so that the game can tolerate a sudden increase in resource needs without noticeable impact to the player experience.

The system then selects a mining algorithm to use (e.g., XMR, Menaro, others). Different cryptocurrencies use different mining algorithms, and for reasons described further herein, the system may utilize more than one cryptocurrency and/or mining algorithm. The system then mines cryptocurrency as the user plays using the selected mining algorithm. The system reports the cryptocurrency generated back to a server associated with the game to participate in building a jackpot that will be paid out to the system operator and winning players as described above.

Mining pools are groups of cooperating miners who agree to share block rewards in proportion to their contributed mining hash power. Mining pools turn the rare occurrence of finding a new element of cryptocurrency (e.g., a bitcoin) through mining into a steady and reliable trickle of created cryptocurrency. Pooling takes multiple users' processing power and allows it to function as a single node. Where mining is described herein, it is understood that an individual player's computing device may or may not be its own node in the cryptocurrency network, but may also be part of a mining pool that acts as a node. The mining pool may be organized by the game operator, or may be a third party well-known pool, such as Slush, AntPool, or others.

In addition to mining cryptocurrency, the system can also simply reward players for their distributed computing power directly. For example, in much that way that Amazon Web Service or Microsoft Azure provides cloud-hosted computing power today, it is also possible to create a distributed processing network out of player computing devices that can perform computation intensive tasks as a kind of distributed supercomputer. This processing power is used for cryptocurrency mining in some embodiments of the game reward system, but can be applied to other processing-intensive problems as well. Solving those problems can generate a monetary reward just like mining that can be distributed to players in the manner described herein.

A current problem that the game reward system also solves is that many cryptocurrencies have recently been overwhelmed by users mining for them. With the expected increase in mining from the game reward system, it is important to spread the load of the additional mining in a manner that will not cause undue load to any cryptocurrency and will allow the system to operate in the face of an overloaded cryptocurrency infrastructure. Thus, the system may employ various load balancing techniques, such as spreading the players' selected mining algorithms among several different cryptocurrencies. In a game of one-thousand people, for example, one-third might be mining cryptocurrency A, one-third cryptocurrency B, and one-third cryptocurrency C. The system can track all the cryptocurrency generated by various games and sessions of the same game over time and can pay out rewards to users in any cryptocurrency. In some cases, one cryptocurrency can even be converted into another. In the previous example, the system might choose to pay the entire jackpot out of cryptocurrency A, even though the game session generated three different cryptocurrencies.

Game rewards can be paid out by the game reward system in many forms. The simplest is a direct cash payment of the user's cryptocurrency of choice (e.g., bitcoin). However, the system might also pay out rewards in the form of prizes, digital applications that the user can redeem the jackpot for, other products and services, free game hours, cash reward gift cards, and so forth. The system may make additional profit or provide players additional benefits that are valuable to them by choosing the type of reward and way to give the jackpot.

The game used with the game reward system can be of many types. Two that are popular today that are compatible with the system are Fortnight and Player Unknown. These games have the characteristic of commonly engaging players for more than an hour at a time, which allows enough time for a reasonable amount of cryptocurrency mining to occur to build a jackpot. Players that leave the game early can be denied their part of the jackpot to encourage players to stay a threshold amount of time to make the system rewards effective. The system can also be applied to other situations such as sports betting. Users that watch a sporting event through the system can generate cryptocurrency for the system and thus can be paid based on the correct outcome of their bets from the jackpot described herein.

In order to startup the system when there are still few players, the system may employ a technique of seeding the jackpot in order to entice and incentivize more players to play. In a game of few players, the jackpot may not be high enough to draw players to play. In such cases, the system operator can add their own money to the jackpot to ensure that a large enough jackpot is available to make players want to vie to win the jackpot. Once the game has enough players the system operator will not need to do this and can rely on the cumulative activity of the crowd to generate all the money needed to pay both winning players and generate profit for the system operator.

FIG. 1 is a block diagram that illustrates components of the game reward system, in one embodiment. The system 100 includes a resource enumeration 110, game resource assessment component 120, resource allocation component 130, cryptocurrency selection component 140, cryptocurrency mining component 150, jackpot accumulation component 160, reward selection component 170, and reward division component 180. Each of these components is described in further detail herein.

The resource enumeration component 110 determines one or more available computing resources on a player's computing device that can be used for mining cryptocurrency. Computing devices today may have many computing resources that can perform the mathematical calculations involved in cryptocurrency mining. CPU's today generally have many cores, and these cores may be asymmetric, meaning that some have different capabilities than others. For example, one core may be low-power and well suited to long mobile device battery life while another core may be more capable of performing difficult calculations but draws more power in doing so. GPU's also can perform mathematical calculations and may also have many cores. Other parts of a computing device may also have computation capabilities, such as a network interface card (NIC), peripherals, and so forth. Each of these may have spare cycles available to the game reward system 100, and the job of the resource enumeration component 110 is to identify each of these computing resources and their available capabilities.

The game resource assessment component 120 determines what a game the player is running on the computing device needs to run effectively. For example, a game may require 50% of the CPU resources, 50% of the GPU resources, some level of network bandwidth, and so on. The requirements of the game may change over time. For example, a game with intense battle scenes may demand high resource usage during a battle when many characters are on the screen at the same time but may have long interludes between battle scenes when far fewer resources are required. The game resource assessment component 120 adapts to the changing conditions of the game and keeps an up-to-date assessment of what the game needs and will soon need at any given point of gameplay.

The resource allocation component 130 uses the output from the resource enumeration component 110 and the game resource assessment component 120 to allocate a set of resources to mining cryptocurrency. The sum of available resources minus what is needed by the game are theoretically available to the system 100 for mining cryptocurrency. In practice, however, it may be desirable to leave a buffer of unused resources to accommodate rapid changes in the game's resource needs. For example, the system may inflate the game resource assessment by 10% or leave 10% of resources unallocated so that the cryptocurrency mining load is not felt by the user and does not produce a perceptible impact on game play. The idea is to use resources that the player will not miss to provide a benefit to the user and avoid interfering with the player's gameplay.

The cryptocurrency selection component 140 determines which of multiple available cryptocurrencies the system 100 will mine with the allocated resources. There are now many cryptocurrencies available, such as Bitcoin, Ripple, Ethereum, and Tether. At various times certain cryptocurrencies have experienced high load and thus poor performance for those mining or using those cryptocurrencies. To avoid this and workaround load problems, the game reward system 100 may attempt to spread the load of many players mining at the same time by having groups of players mine different cryptocurrencies. The cryptocurrency selection component 140 may also consider such factors as time of day, geographic location, and network utilization to choose a server to interact with that is expected to be less busy.

The cryptocurrency mining component 150 performs the blockchain hashing that mines new cryptocurrency using the selected cryptocurrency and allocated resources. The validity of each cryptocurrency's coins is provided by a blockchain. A blockchain is a continuously growing list of records, called blocks, which are linked and secured using cryptography. Each block typically contains a hash pointer as a link to a previous block, a timestamp, and transaction data. By design, blockchains are inherently resistant to modification of the data. It is "an open, distributed ledger that can record transactions between two parties efficiently and in a verifiable and permanent way".

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. Blockchains are secure by design and are an example of a distributed computing system with high Byzantine fault tolerance. Decentralized consensus has therefore been achieved with a blockchain. Blockchains solve the double-spending problem without the need of a trusted authority or central server, assuming no 51% attack (that has worked against several cryptocurrencies).

In cryptocurrency networks, mining is a validation of transactions. For this effort, successful miners obtain new cryptocurrency as a reward. The reward decreases transaction fees by creating a complementary incentive to contribute to the processing power of the network. The rate of generating hashes, which validate any transaction, has been increased using specialized machines such as FPGAs and ASICs running complex hashing algorithms like SHA-256 and Scrypt. This arms race for cheaper-yet-efficient machines has been on since the day the first cryptocurrency, bitcoin, was introduced in 2009. With more people venturing into the world of virtual currency, generating hashes for this validation has become far more complex over the years, with miners having to invest large sums of money on employing multiple high-performance ASICs. The game reward system 100 takes advantage of the unused computing power of thousands (and potentially millions) of computing devices utilized for gaming every day to mine cryptocurrency and feeds the rewards of mining back into the economics of the game itself.

The jackpot accumulation component 160 gathers the cryptocurrency mined by each player's computing device into a central jackpot for distribution and use by the game. Although each player's computing device may only generate a small amount of cryptocurrency per hour (e.g., ten cents worth), the accumulated efforts of many players' computing devices can add up to significant amounts of value (e.g., hundreds or thousands of dollars' worth). This can provide an ample jackpot for both compensating the game operator, who must pay for servers, network bandwidth, and other costs, as well as rewarding top players, who are incentivized to play by the availability of a reward.

The reward selection component 170 selects one or more game winners from among the players and selects one or more available rewards to provide to the game winners. Depending on the type of game there may be one winner or there may be several places (e.g., first, second, and third place) that are awarded prizes for their rank in the game. Although the system 100 primarily produces new cryptocurrency through mining, through business relationships, sponsorships, and other activities, the game operator may have available a selection of prizes that the system automatically determines or requests a selection from the players. For example, the system may offer free game time, gift certificates, application downloads from a virtual store, or other rewards as a game prize in addition to simply rewarding the wining players with cryptocurrency.

The reward division component 180 divides the accumulated jackpot among the game operator and the rewards selected to provide to the winning players. For example, the component 180 may allocate 10-25% of the jackpot as profit to the game operator, another 25-50% to buying prizes for the first-place winner, and so on. This process is highly variable as there are many types of games and many types of business model that a game operator may want to employ. The reward division component 180 is configurable to accommodate many types of reward division. For example, in some games the operator may choose to make no profit in order to increase the rewards available to players, while in other games the operator may take most of the rewards generated as profit. Similarly, in some games the rewards allocated to players may all go to one player in a large jackpot while in other games the rewards may be smaller and split among many players.

The computing device on which the game reward system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform tasks or implement abstract data types. Typically, the functionality of the program modules may be combined or distributed as desired in various embodiments.

Figure 2:
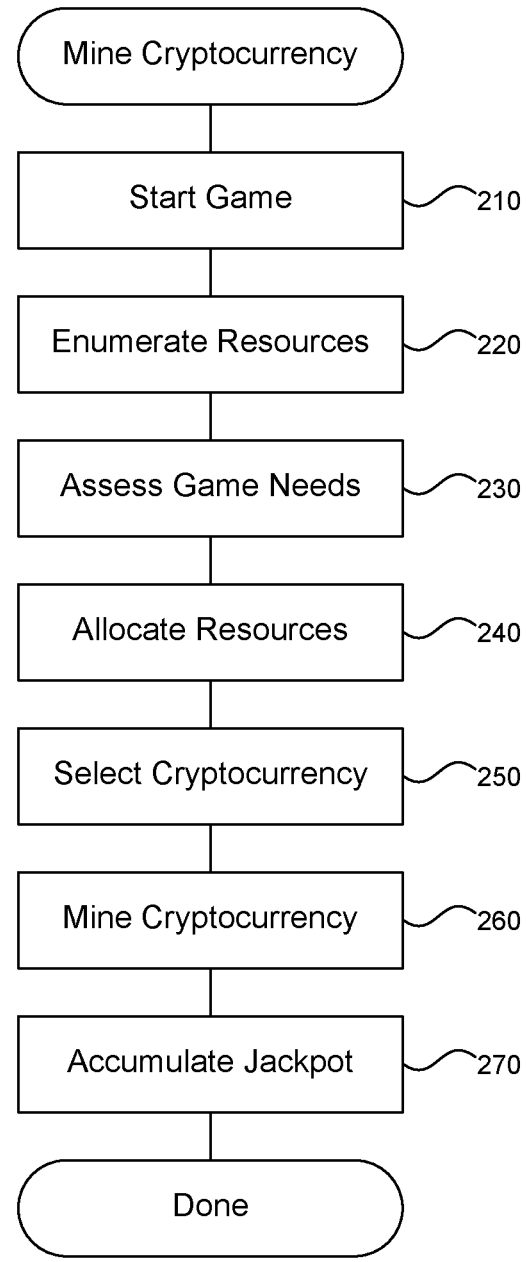
FIG. 2 is a flow diagram that illustrates processing of the game reward system to mine cryptocurrency, in one embodiment.

FIG. 2 is a flow diagram that illustrates processing of the game reward system to mine cryptocurrency, in one embodiment. Beginning in block 210, the system receives an indication that a player has started a game on a computing device. In some cases, the system may operate after the player has finished playing the game, such as when the computer is idle, but in general the system begins operation when the player launches a game that implements the system. The player may launch the game by running an executable program on the player's computing device, accessing an online arcade (e.g., Steam or Xbox Live), downloading the game from an application store, or by other common methods of launching games.

Continuing in block 220, the system enumerates one or more available computing resources on the player's computing device that can be used for mining cryptocurrency. Computing devices today may have many computing resources that can perform the mathematical calculations involved in cryptocurrency mining. CPU's today generally have many cores, and these cores may be asymmetric, meaning that some have different capabilities than others. For example, one core may be low-power and well suited to long mobile device battery life while another core may be more capable of performing difficult calculations but draws more power in doing so. GPU's also can perform mathematical calculations and may also have many cores. Other parts of a computing device may also have computation capabilities, such as a network interface card (NIC), peripherals, and so forth. Each of these may have spare cycles available to the game reward system, and the job of the resource enumeration step is to identify each of these computing resources and their available capabilities.

Continuing in block 230, the system assesses resources the game the player is running on the computing device needs to run properly. For example, a game may require 50% of the CPU resources, 50% of the GPU resources, some level of network bandwidth, and so on. The requirements of the game may change over time. For example, a game with intense battle scenes may demand high resource usage during a battle when many characters are on the screen at the same time but may have long interludes between battle scenes when far fewer resources are required. The system adapts to the changing conditions of the game and keeps an up-to-date assessment of what the game needs and will soon need at any given point of gameplay.

Continuing in block 240, the system uses the output from enumerating resources and assessing game needs to allocate a set of resources to mining cryptocurrency. The sum of available resources minus what is needed by the game are theoretically available to the system for mining cryptocurrency. In practice, however, it may be desirable to leave a buffer of unused resources to accommodate rapid changes in the game's resource needs. For example, the system may inflate the game resource assessment by 10% or leave 10% of resources unallocated so that the cryptocurrency mining load is not felt by the user and does not produce a perceptible impact on game play. The idea is to use resources that the player will not miss to provide a benefit to the user and avoid interfering with the player's gameplay.

Continuing in block 250, the system determines which of multiple available cryptocurrencies the system will mine with the allocated resources. There are now many cryptocurrencies available, such as Bitcoin, Ripple, Ethereum, and Tether. At various times certain cryptocurrencies have experienced high load and thus poor performance for those mining or using those cryptocurrencies. To avoid this and workaround load problems, the game reward system may attempt to spread the load of many players mining at the same time by having groups of players mine different cryptocurrencies. Cryptocurrency selection may also consider such factors as time of day, geographic location, and network utilization to choose a server to interact with that is expected to be less busy.

Continuing in block 260, the system mines cryptocurrency during gameplay by performing blockchain hashing that mines new cryptocurrency using the selected cryptocurrency and allocated resources. The validity of each cryptocurrency's coins is provided by a blockchain. A blockchain is a continuously growing list of records, called blocks, which are linked and secured using cryptography. Each block typically contains a hash pointer as a link to a previous block, a timestamp, and transaction data. In cryptocurrency networks, mining is a validation of transactions. For this effort, successful miners obtain new cryptocurrency as a reward. The reward decreases transaction fees by creating a complementary incentive to contribute to the processing power of the network. The rate of generating hashes, which validate any transaction, determines how much cryptocurrency the player's device mines in a given time period.

The game reward system takes advantage of the unused computing power of thousands (and potentially millions) of computing devices utilized for gaming every day to mine cryptocurrency and feeds the rewards of mining back into the economics of the game itself. In some embodiments, the system may continue to mine cryptocurrency at times other than during gameplay, with the player's permission, such as when the player's computing device is idle or when the player is running other games or applications.

Continuing in block 270, the system sends the mined cryptocurrency to a central repository that accumulates a jackpot for distribution to one or more players. The system tracks a jackpot contributed to by all the players and may reward the jackpot at significant moments throughout gameplay. Players may be rewarded for being first to reach a checkpoint, for winning the whole game, for accomplishing difficult feats, for beating world records, or any other event the game operator/implementor deems significant and worthy of a reward. The accumulated jackpot represents a store of funds that can be used by the system to fund operator profit and player rewards. After block 270, these steps conclude.

Figure 3:
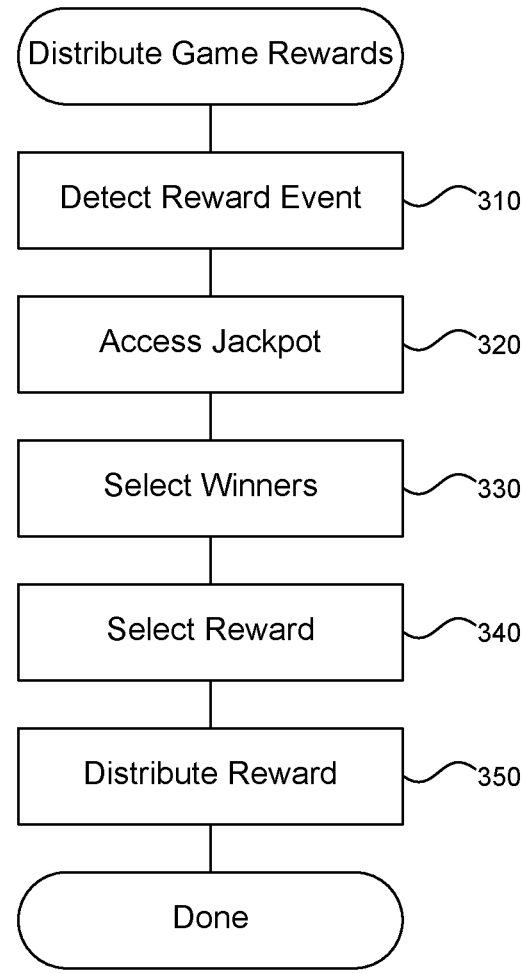
FIG. 3 is a flow diagram that illustrates processing of the game reward system to distribute game rewards, in one embodiment.

FIG. 3 is a flow diagram that illustrates processing of the game reward system to distribute game rewards, in one embodiment. Beginning in block 310, the system detects an event for which the game distributes a reward to one or more players of the game. The event may be the conclusion of the game, reaching one of several milestones in the game, overcoming a previously achieved record in the game (e.g., highest score, highest jump, fastest run), winning a championship that spans multiple game sessions, or any other game event defined by the implementor of the game to cause a reward to be distributed.

Continuing in block 320, the system accesses an accumulated jackpot to determine an amount of value available to distribute to eligible players. The system implementor defines what activity earns a reward, how many players are rewarded, the percentage of the jackpot allocated to each player and the operator, and so forth. The system can be configured to support a variety of business models and game formats to provide the best possible player engagement and operator profit.

The jackpot gathers the cryptocurrency mined by each player's computing device into a central jackpot for distribution and use by the game. Although each player's computing device may only generate a small amount of cryptocurrency per hour (e.g., ten cents worth), the accumulated efforts of many players' computing devices can add up to significant amounts of value (e.g., hundreds or thousands of dollars' worth). This can provide an ample jackpot for both compensating the game operator, who must pay for servers, network bandwidth, and other costs, as well as rewarding top players, who are incentivized to play by the availability of a reward.

Continuing in block 330, the system selects one or more game winners from among the players playing the game. Depending on the type of game there may be one winner or there may be several places (e.g., first, second, and third place) that are awarded prizes for their rank in the game. There may also be a criterion that defines winners (e.g., everyone that achieves 1,000 points) so that some game sessions may have no winners and others may have many winners dividing the jackpot.

Continuing in block 340, the system selects one or more available rewards to provide to the game winners. Although the system primarily produces new cryptocurrency through mining, through business relationships, sponsorships, and other activities, the game operator may have available a selection of prizes that the system automatically determines or requests a selection from the players. For example, the system may offer free game time, gift certificates, application downloads from a virtual store, or other rewards as a game prize in addition to simply rewarding the wining players with cryptocurrency.

Continuing in block 350, the system divides the selected rewards and distributes the rewards to the winning players and distributes profit to an operator of the game. The system divides the accumulated jackpot among the game operator and the rewards selected to provide to the winning players. For example, the system may allocate 10-25% of the jackpot as profit to the game operator, another 25-50% to buying prizes for the first-place winner, and so on. This process is highly variable as there are many types of games and many types of business model that a game operator may want to employ. The system is configurable to accommodate many types of reward division. For example, in some games the operator may choose to make no profit in order to increase the rewards available to players, while in other games the operator may take most of the rewards generated as profit. Similarly, in some games the rewards allocated to players may all go to one player in a large jackpot while in other games the rewards may be smaller and split among many players. After block 350, these steps conclude.

From the foregoing, it will be appreciated that specific embodiments of the game reward system have been described herein for purposes of illustration, but that various modifications may be made without deviating from the spirit and scope of the invention. Accordingly, the invention is not limited except as by the appended claims.

I claim:

1. A computer-implemented method to mine cryptocurrency on game players' computers and distribute game rewards from the mined cryptocurrency, the method comprising:
    receiving an indication that a player has started a game on a computing device;
    enumerating one or more available computing resources on the player's computing device to identify resources that can be used for mining cryptocurrency, wherein enumerating resources comprises identifying one or more CPUs and GPUs of the player's computing device;
    assessing resources the game the player is running on the computing device needs to run properly to identify game needs;
    using the identified resources and the identified game needs to allocate a subset of the identified resources to mining cryptocurrency, wherein allocating resources to mine cryptocurrency comprises taking a sum total of available resources of the computing device, subtracting resources needed by the game, and subtracting an additional amount as a buffer of unused resources;
    determining which of multiple available cryptocurrencies to mine with the allocated subset of resources in a manner that spreads a load of many players mining at the same time by having groups of players mine different cryptocurrencies;
    mining on the player's computing device during gameplay by performing blockchain hashing that mines new cryptocurrency for the determined cryptocurrency using the allocated subset of resources in a manner that avoids interfering with the game player's gameplay;

sending the mined cryptocurrency to a central repository that accumulates a jackpot from cryptocurrency mined on multiple players' computing devices; and distributing the jackpot to the player, wherein the jackpot distributed to the player includes cryptocurrency mined on another player's computing device and the player is awarded an amount greater than an amount mined by the player's computing device, wherein the preceding steps are performed by at least one processor.

2. The method of claim 1 wherein assessing game resources comprises determining central processor utilization, graphics processor utilization, and network bandwidth of the game.

3. The method of claim 1 wherein assessing game resources comprises monitoring the game for changing needs over time based on changing conditions of the game and keeps an up-to-date assessment of what the game needs to operate.

4. The method of claim 1 wherein mining cryptocurrency comprises validating cryptocurrency transactions by hashing using a selected hashing algorithm.

5. The method of claim 1 wherein mining cryptocurrency comprises continuing to mine after gameplay has ended upon detecting that the computing device is idle.

6. The method of claim 1 wherein sending the mined cryptocurrency to a central repository comprises tracking a jackpot contributed to by all the players of the game and rewarding the jackpot at significant moments throughout gameplay.

7. A non-transitory computer-readable medium comprising instructions for controlling a computer system to mine cryptocurrency on game players' computers and distribute game rewards from the mined cryptocurrency, wherein the instructions, upon execution, cause a processor to perform actions comprising:

receiving an indication that a player has started a game on a computing device;

enumerating one or more available computing resources on the player's computing device to identify resources that can be used for mining cryptocurrency, wherein enumerating resources comprises identifying one or more CPUs and GPUs of the player's computing device;

assessing resources the game the player is running on the computing device needs to run properly to identify game needs;

using the identified resources and the identified game needs to allocate a subset of the identified resources to mining cryptocurrency, wherein allocating resources to mine cryptocurrency comprises taking a sum total of available resources of the computing device, subtracting resources needed by the game, and subtracting an additional amount as a buffer of unused resources;

determining which of multiple available cryptocurrencies to mine with the allocated subset of resources in a manner that spreads a load of many players mining at the same time by having groups of players mine different cryptocurrencies;

mining on the player's computing device during gameplay by performing blockchain hashing that mines new cryptocurrency for the determined cryptocurrency using the allocated subset of resources in a manner that avoids interfering with the game player's gameplay;

sending the mined cryptocurrency to a central repository that accumulates a jackpot from cryptocurrency mined on multiple players' computing devices; and distributing the jackpot to the player, wherein the jackpot distributed to the player includes cryptocurrency mined on another player's computing device and the player is awarded an amount greater than an amount mined by the player's computing device.

8. The medium of claim 7 wherein assessing game resources comprises determining central processor utilization, graphics processor utilization, and network bandwidth of the game.

9. The medium of claim 7 wherein assessing game resources comprises monitoring the game for changing needs over time based on changing conditions of the game and keeps an up-to-date assessment of what the game needs to operate.

10. The medium of claim 7 wherein mining cryptocurrency comprises validating cryptocurrency transactions by hashing using a selected hashing algorithm.

11. The medium of claim 7 wherein mining cryptocurrency comprises continuing to mine after gameplay has ended upon detecting that the computing device is idle.

12. The medium of claim 7 wherein sending the mined cryptocurrency to a central repository comprises tracking a jackpot contributed to by all the players of the game and rewarding the jackpot at significant moments throughout gameplay.

* * * * *